United States Patent
Hoyer et al.

(10) Patent No.: US 7,892,345 B2
(45) Date of Patent: Feb. 22, 2011

(54) METHOD FOR PRODUCING TRANSPARENT PIGMENT VIOLET 23

(75) Inventors: Wolfgang Hoyer, Frankfurt am Main (DE); Leonhard Unverdorben, Bad Saeckingen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/531,797

(22) PCT Filed: Feb. 28, 2008

(86) PCT No.: PCT/EP2008/001590

§ 371 (c)(1),
(2), (4) Date: Sep. 17, 2009

(87) PCT Pub. No.: WO2008/116541

PCT Pub. Date: Oct. 2, 2008

(65) Prior Publication Data

US 2010/0101456 A1    Apr. 29, 2010

(30) Foreign Application Priority Data

Mar. 23, 2007    (DE) .................. 10 2007 013 962

(51) Int. Cl.
*C09B 67/10* (2006.01)
*C09B 67/04* (2006.01)
*C09D 11/02* (2006.01)

(52) U.S. Cl. ............................ 106/498; 544/99; 546/28

(58) Field of Classification Search .................. 106/498; 544/99; 546/28
See application file for complete search history.

(56) References Cited

U.S. PATENT DOCUMENTS

| 5,318,627 | A | * | 6/1994 | Dietz et al. | 106/498 |
| 6,476,222 | B2 | * | 11/2002 | Smith et al. | 544/74 |
| 6,911,075 | B2 | * | 6/2005 | Grandidier et al. | 106/499 |
| 2005/0139127 | A1 | * | 6/2005 | Smith et al. | 106/493 |
| 2007/0186804 | A1 | | 8/2007 | Heckmann et al. | |
| 2009/0221733 | A1 | * | 9/2009 | Idemura et al. | 524/401 |

FOREIGN PATENT DOCUMENTS

| EP | 1038929 | | 9/2000 |
| EP | 1194485 | | 1/2001 |
| EP | 1411091 | A1 * | 4/2004 |
| EP | 1411092 | | 4/2004 |
| EP | 1655352 | | 5/2006 |
| JP | 3916786 | | 5/2007 |

OTHER PUBLICATIONS

PCT International Search Report for PCT/EP2008/001590 mailed Jan. 27, 2009.
English translation of PCT International Preliminary Report on Patentability for PCT/EP2008/001590, mailed Nov. 12, 2009.
English Abstract for JP 3916786, published May 23, 2007.
English Abstract for JP 52-000935, published Jan. 6, 1977.

* cited by examiner

*Primary Examiner*—Anthony J Green
(74) *Attorney, Agent, or Firm*—Anthony A. Bisulca

(57) ABSTRACT

The invention accordingly relates to a method for preparing transparent C.I. Pigment Violet 23 by salt kneading a Pigment Violet 23-crude in the presence of a crystalline salt and an organic liquid. Said method is characterized in that the organic liquid is propylene carbonate.

10 Claims, No Drawings

METHOD FOR PRODUCING TRANSPARENT PIGMENT VIOLET 23

Pigments used for coloring high molecular weight organic materials have to meet high performance requirements, such as high color strengths, easy dispersibility, high chroma and cleanness of hue and good fastness to light and weather. One desideratum is an ideally universal utility for coloring different high molecular weight systems such as plastics and also aqueous and solvent-containing printing inks and coatings. High pigment concentrations in the grind are the trend in coatings and printing inks alike; therefore, high-pigmented coating and printing ink concentrates or millbases with nonetheless low viscosity are required; similarly, the viscosity of the final coating or of the printing ink has to be fit for purpose. Printing inks are required to have a high transparency, while coating systems are desired to have impeccable fastnesses to overcoating and solvents, resistance to alkali and acid, and, particularly in the case of metallic coatings, high transparency and brilliant hues. Plastics pigmentation requirements are high bleed fastness, heat stability and good dispersibility, as reflected in high color strengths for example. In addition, an ideally universal utility in different systems, for example in aqueous and solvent-containing systems, is desirable. desideratum C.I. Pigment Violet 23 (C.I. No. 51319, also known as carbazole violet, hereinafter referred to in brief as PV 23) is an important commercial pigment, used particularly in printing inks and lately in color filters.

EP-B1-1 194 485 and also EP-A1-1411 091 disclose preparing a transparent and strong Pigment Violet 23 by salt kneading in the presence of an organic liquid. Dimethylformamide is mentioned as a particularly preferred organic liquid.

However, dimethylformamide is classified as poisonous and belongs to the category of suspected human teratogens.

There is therefore a need for a harmless organic liquid that be used in a salt-kneading operation and yields a Pigment Violet 23 having similar coloristic properties.

We have found that, surprisingly, propylene carbonate meets these requirements. Propylene carbonate is also known as 4-methyl-1,3-dioxolan-2-one or propylene glycol carbonate.

The invention accordingly provides a process for preparing transparent C.I. Pigment Violet 23 by salt kneading a crude Pigment Violet 23 in the presence of a crystalline, preferably inorganic, salt and of an organic liquid wherein the organic liquid is propylene carbonate.

Salt kneading according to the invention comprises kneading a crude Pigment Violet 23 with propylene carbonate and with the crystalline, preferably inorganic, salt in the form of a kneadable, high-viscosity paste.

The crude PV 23 used can be a commercially available product, usually manufactured by the method in BIOS final report 960, page 75. The starting material used can also be a PV 23 as per JP-39/16786 or JP52/935. It is also possible to use crude PV 23 in amorphous form in the salt-kneading operation. "Amorphous" is to be understood as referring to an X-ray index of less than 2, preferably between 0 and 1.5. To achieve this index, the crude PV 23 can be subjected to a dry pregrinding operation with salt in a suitable mill before the kneading operation. The salt in the dry pregrinding operation can be the same as in the subsequent salt-kneading operation.

Useful crystalline salts include salts having mono-, bi or trivalent metal cations, for example alkali, alkaline-earth and earth metal ions, with inorganic acids, for example hydrochloric acid, sulfuric acid or phosphoric acid, or with organic acids having 1 to 6 carbon atoms, for example formic acid and acetic acid. Preferred salts are sodium formate; sodium acetate or calcium acetate; sodium citrate; sodium potassium tartrate; sodium chloride, potassium chloride, calcium chloride, zinc chloride or aluminum chloride; sodium sulfate or aluminum sulfate; calcium carbonate; or mixtures thereof, and particularly sodium chloride. The salts are usually used in a comparatively large amount, for example in at least 1 to 10 times, preferably 2 to 8 times and particularly 3 to 6 times the amount based on the weight of Pigment Violet 23. Larger amounts can also be used, but are uneconomical.

Commercially available salt can be coarse in terms of particle size, and can be comminuted by a grinding operation, for example to an average particle size of 0.1 to 1 mm, before use in the salt-kneading operation. It is particularly preferable to use a micronized salt having an average particle size of 5 to 100 µm, particularly 10 to 50 µm.

The propylene carbonate is used in such amounts that the millbase forms a glutinous, doughy mass. The amount used is experientially between the 0.05 to 0.8 times the amount, preferably between the 0.1 to 0.4 times the amount and particularly between the 0.12 times to 0.35 times amount based on the weight of pigment-salt mixture.

The salt-kneading operation may also utilize acids, particularly acids having a pK value of less than 4.8. It may be preferable to use phosphoric acid, carboxylic acids, such as acetic acid, dodecylbenzenesulfonic acid and in particular sulfuric acid.

The kneading time can range from 30 minutes to 48 hours or longer, it is usually in the range from 1 to 24 hours and particularly in the range from 2 to 8 hours. Useful kneaders include customary continuous or batch, single- or multi-arm kneaders, preferably two-arm batch kneaders, which exert very high shearing forces on the kneadbase. Customary blade shapes are the trough-mixer blade (also known as a sigma or Z-blade) or the masticator blade.

The kneading temperature is preferably in the range from −20 to 200° C., particularly in the range from 20 to 170° C. and more preferably in the range from 50 to 150° C. If necessary, cooling can also be applied during kneading. If necessary, the glutinous consistency of the kneadbase can be adjusted/kept constant during kneading by further addition of propylene carbonate and/or salt. The consistency of the kneadbase can change during kneading, for example by evaporation of the organic liquid or by grinding the Violet 23 into smaller particle sizes. After kneading has ended, the salt used and the propylene carbonate are advantageously removed by aqueous extraction (suspension and suction filtration) at acidic pH. Acids are usually used to speed the dissolving of the salt used, examples being hydrochloric acid, sulfuric acid and acetic acid. The pH set is usually less than 3, preferably in the range from 1 to 2, or the knead base is stirred into 1% to 10% by weight acid.

Organic solvents can also be added for the extraction.

The extraction can be carried out at any desired temperature as long as the medium remains liquid (which may even be the case when employing a temperature above the boiling point of the mixture), usually at temperatures between 0 and 100° C., more particularly between 60° C. and boiling temperature.

The transparent Pigment Violet 23 prepared by following the process of the invention can be isolated using customary methods, for example by filtering, decanting or centrifuging. Filtering is preferred. Solvents can be removed by washing.

Further, auxiliary agents can be added before, during and/or after the process of the invention, examples being surfactants, pigmentary and nonpigmentary dispersants, fillers, standardizers, resins, waxes, defoamers, antistats, antidusters, extenders, shading colorants, preservatives, dryness retarders, rheology control additives, wetters, antioxidants, UV absorbers, photostabilizers and biocides, or a combination thereof.

Useful surfactants include anionic or anion-active, cationic or cation-active and nonionic or amphoteric substances or mixtures thereof.

"Nonpigmentary dispersants" refers to substances which structurally are not derived from organic pigments. They are often added as dispersants as early as the actual preparation of the pigments.

By pigmentary dispersants are meant pigment dispersants which are known per se and which derive from an organic pigment as foundational structure and are prepared by chemical modification of said foundational structure, examples being sucrose-containing pigment dispersants, piperidyl-containing pigment dispersants, naphthalene- or perylene-derived pigment dispersants, pigment dispersants having functional groups linked to the foundational pigment structure via a methylene group, foundational pigment structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups. The process of the invention may utilize one or more pigment dispersants in a total amount of 0.1% to 25% by weight, preferably 0.5% to 20% by weight, particularly 1.0% to 17.5% by weight, based on the weight of Pigment Violet 23.

Anionic groups on the pigmentary and nonpigmentary dispersants, surfactants or resins used as auxiliary agents can also be combined with 1-, 2- or 3-valent ions to be present as salts, particularly as laked salts, for example due to calcium, magnesium, barium, strontium, manganese or aluminum ions or due to quaternary ammonium ions. "Fillers/extenders" refers to a multiplicity of substances as per DIN 55943 and DIN EN 971-1, for example various grades of talc, kaolin, mica, dolomite, lime, barium sulfate or titanium dioxide.

The process of the invention provides PV 23 in highly transparent form and with excellent color strength. The pigment has a specific surface area of 60 to 150 $m^2/g$, preferably 80 to 140 $m^2/g$, measured by the BET method. The salt-kneading operation of the invention has the effect that the majority of particles are not reduced in size, but are converted into an advantageous crystalline form as a result of the action of shearing forces between the salt crystals in the presence of the organic liquid. In contrast to many customary organic solvents, diethylene glycol being an example, propylene carbonate does give particularly good results.

The Pigment Violet 23 prepared according to the invention can be incorporated in dried, solid form, in free-flowing, pulverulent constitution or as a granulate, but also for example as an aqueous presscake, into the contemplated application media, for example into plastics, printing inks and paints, but particularly in high-tech applications, such as inkjet inks, color filters and electrophotographic toners and developers.

INVENTIVE EXAMPLE 1

15 g of commercially available crude Pigment Violet 23 (Wuxi Xinguang Chemical Industry Co. Ltd) are mixed with 90 g of sodium chloride (<30 micrometers) in an IKA mill for two times 30 s. Then, the mixture is kneaded in a laboratory kneader (Werner & Pfleiderer) with 30 g of propylene carbonate at 80° C. at 100 rpm for 8 h. Subsequently, the knead base is admixed with 800 ml of 5% by weight hydrochloric acid and filtered with suction, the filtercake is washed with ion-free water. Then, the filtercake is dried in a drying cabinet at 80° C. to leave 14.6 g of pigment.

An offset printing ink prepared from the resulting pigment to the PV 3/1 test method (Clariant International AG, Global Quality Assurance, January 2004) gives a color strength of 100% compared with the control (Cromophtal® Violett GT, Ciba).

COMPARATIVE EXAMPLE 1

15 g of commercially available crude Pigment Violet 23 (Wuxi Xinguang Chemical Industry Co. Ltd) are mixed with 90 g of sodium chloride (<30 micrometers) in an IKA mill for two times 30 s. Then, the mixture is kneaded in a laboratory kneader (Werner & Pfleiderer) with 30 g of diethylene glycol at 80° C. at 100 rpm for 8 h. Subsequently, the knead base is admixed with 800 ml of 5% by weight hydrochloric acid and filtered with suction, the filtercake is washed with ion-free water. Then, the filtercake is dried in a drying cabinet at 80° C. to leave 14.5 g of pigment.

An offset printing ink prepared from the resulting pigment to the PV 3/1 test method (Clariant International AG, Global Quality Assurance, January 2004) gives a color strength of only 75% compared with the control (Cromophtal® Violett GT, Ciba).

We claim:

1. A process for preparing transparent C.I. Pigment Violet 23 comprising the step of salt kneading a crude Pigment Violet 23 in the presence of a crystalline salt and an organic liquid wherein the organic liquid is propylene carbonate.

2. The process as claimed in claim 1 wherein the crystalline salt is mono-, bi- or trivalent metal cations, inorganic acid radicals or a mixture of thereof.

3. The process as claimed in claim 1, wherein the crystalline salt is sodium chloride.

4. The process as claimed in claim 1, wherein the crystalline salt is a micronized crystalline salt.

5. The process as claimed in claim 1, wherein the salt kneading is carried out at a temperature of 50 to 150° C.

6. The process as claimed in claim 1, wherein the amount of propylene carbonate used is between 0.05 and 0.8 times the amount based on the weight of the pigment-salt mixture.

7. The process as claimed in claim 6 wherein the amount of propylene carbonate used is between 0.12 and 0.35 times the amount based on the weight of the pigment-salt mixture.

8. The process as claimed in claim 1, wherein the crystalline salt is used in 1 to 10 times the amount based on the weight of the pigment.

9. The process as claimed in claim 1, wherein salt and propylene carbonate are removed by aqueous extraction at acidic pH after kneading has ended.

10. The process as claimed in claim 1, wherein auxiliary agents are added, wherein the auxiliary agents are selected from the group consisting of surfactants, pigmentary, dispersants nonpigmentary dispersants, fillers, standardizers, resins, waxes, defoamers, antistats, antidusters, extenders, shading colorants, preservatives, dryness retarders, rheology control additives, wetters, antioxidants, UV absorbers, photostabilizers and biocides.

* * * * *